US012724785B2

(12) United States Patent
Singh et al.

(10) Patent No.: US 12,724,785 B2
(45) Date of Patent: Sep. 1, 2026

(54) DATA CREATION APPARATUS AND DATA CREATION METHOD

(71) Applicant: Hitachi, Ltd., Tokyo (JP)

(72) Inventors: Divya Singh, Tokyo (JP); Atsumi Terayama, Tokyo (JP); Ken Sugimoto, Tokyo (JP); Mika Takata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 19/059,213

(22) Filed: Feb. 20, 2025

(65) Prior Publication Data

US 2026/0037524 A1 Feb. 5, 2026

(30) Foreign Application Priority Data

Jul. 31, 2024 (JP) ................................. 2024-124469

(51) Int. Cl.

| | |
|---|---|
| ***G06F 16/2457*** | (2019.01) |
| ***G06F 16/28*** | (2019.01) |
| ***G06F 40/205*** | (2020.01) |
| ***G06F 40/284*** | (2020.01) |
| ***G06F 40/40*** | (2020.01) |

(52) U.S. Cl.

CPC ...... *G06F 16/24578* (2019.01); *G06F 16/285* (2019.01); *G06F 40/205* (2020.01); *G06F 40/284* (2020.01); *G06F 40/40* (2020.01)

(58) Field of Classification Search

CPC ...... G06F 40/284; G06F 40/40; G06F 40/205; G06F 16/24578; G06F 16/285

See application file for complete search history.

(56) References Cited

U.S. PATENT DOCUMENTS

| | | | | |
|---|---|---|---|---|
| 11,664,099 | B1 | 5/2023 | Jain et al. | |
| 11,947,923 | B1 * | 4/2024 | Jain | G06V 10/70 |
| 12,411,844 | B1 * | 9/2025 | Krishna | G06F 16/3329 |
| 2007/0150802 | A1 * | 6/2007 | Wan | G06F 16/35 707/999.1 |
| 2014/0082091 | A1 | 3/2014 | Rexer | |
| 2017/0228457 | A1 * | 8/2017 | Billawal | G06F 40/35 |
| 2017/0308927 | A1 * | 10/2017 | Woods | G06Q 30/0277 |
| 2018/0300315 | A1 * | 10/2018 | Leal | G06F 40/205 |

* cited by examiner

*Primary Examiner* — Tarek Chbouki

(74) *Attorney, Agent, or Firm* — Procopio, Cory, Hargreaves & Savitch LLP

(57) ABSTRACT

A token verification unit performs token verification to verify whether metadata generated by inputting a document into a large language model is appropriate or not using the metadata and a token obtained from nodes on a trace path of a dependency analysis tree based on the input document, a token match score calculation unit obtains a token match score on the basis of a result of the token verification, a grouping unit which groups the metadata in accordance with user's interest terms data which reflects a user's interests using the metadata as it is if the token match score satisfies a predetermined condition, a confidence score calculation unit which calculates a confidence score for the grouped metadata, and a rank calculation unit which ranks the metadata in accordance with the confidence score.

20 Claims, 13 Drawing Sheets

FIG. 1

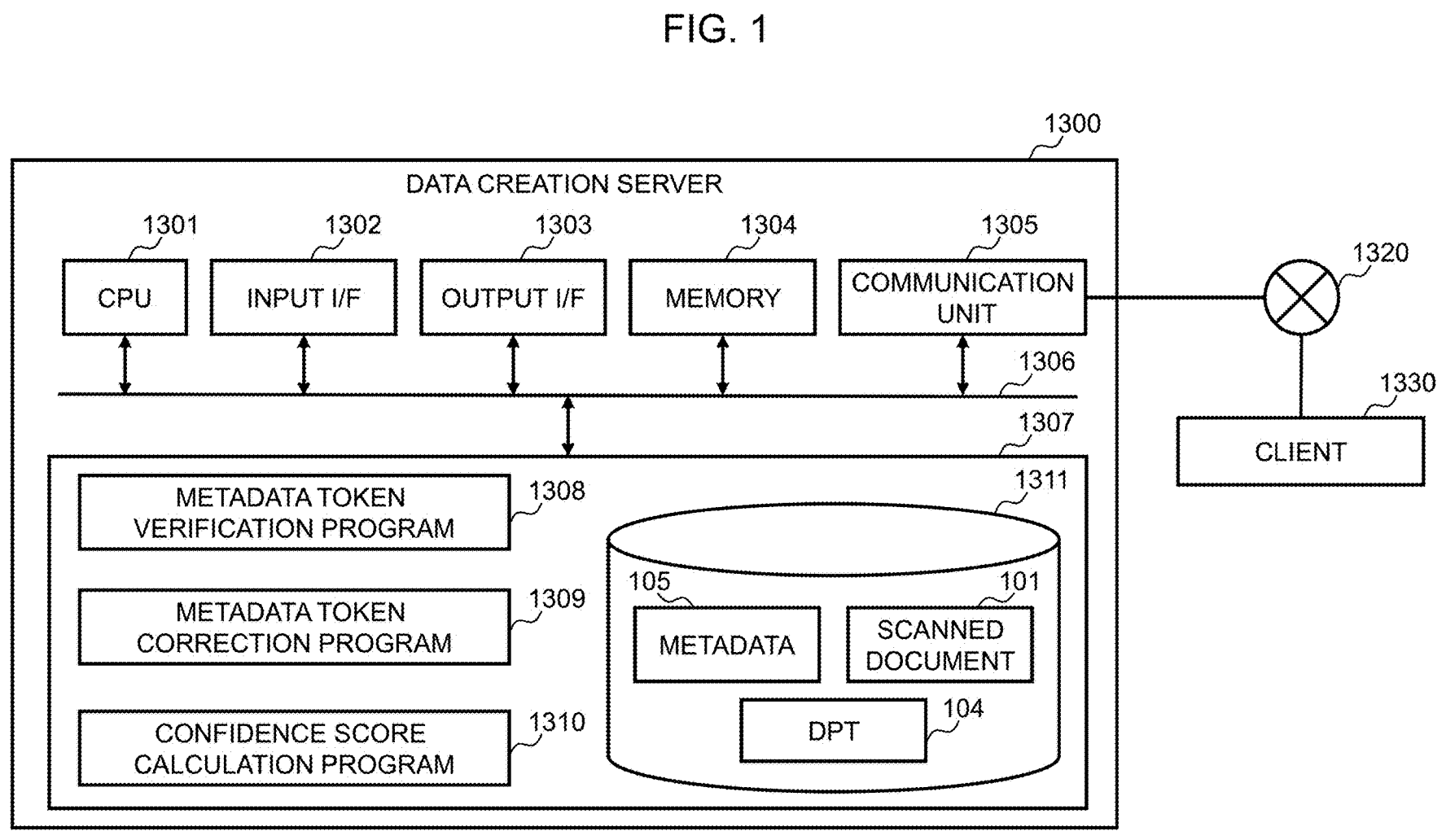

1300
DATA CREATION SERVER
1301
CPU
1302
INPUT I/F
1303
OUTPUT I/F
1304
MEMORY
1305
COMMUNICATION UNIT
1306
1307
1308
METADATA TOKEN VERIFICATION PROGRAM
1309
METADATA TOKEN CORRECTION PROGRAM
1310
CONFIDENCE SCORE CALCULATION PROGRAM
1311
105
METADATA
101
SCANNED DOCUMENT
104
DPT
1320
1330
CLIENT

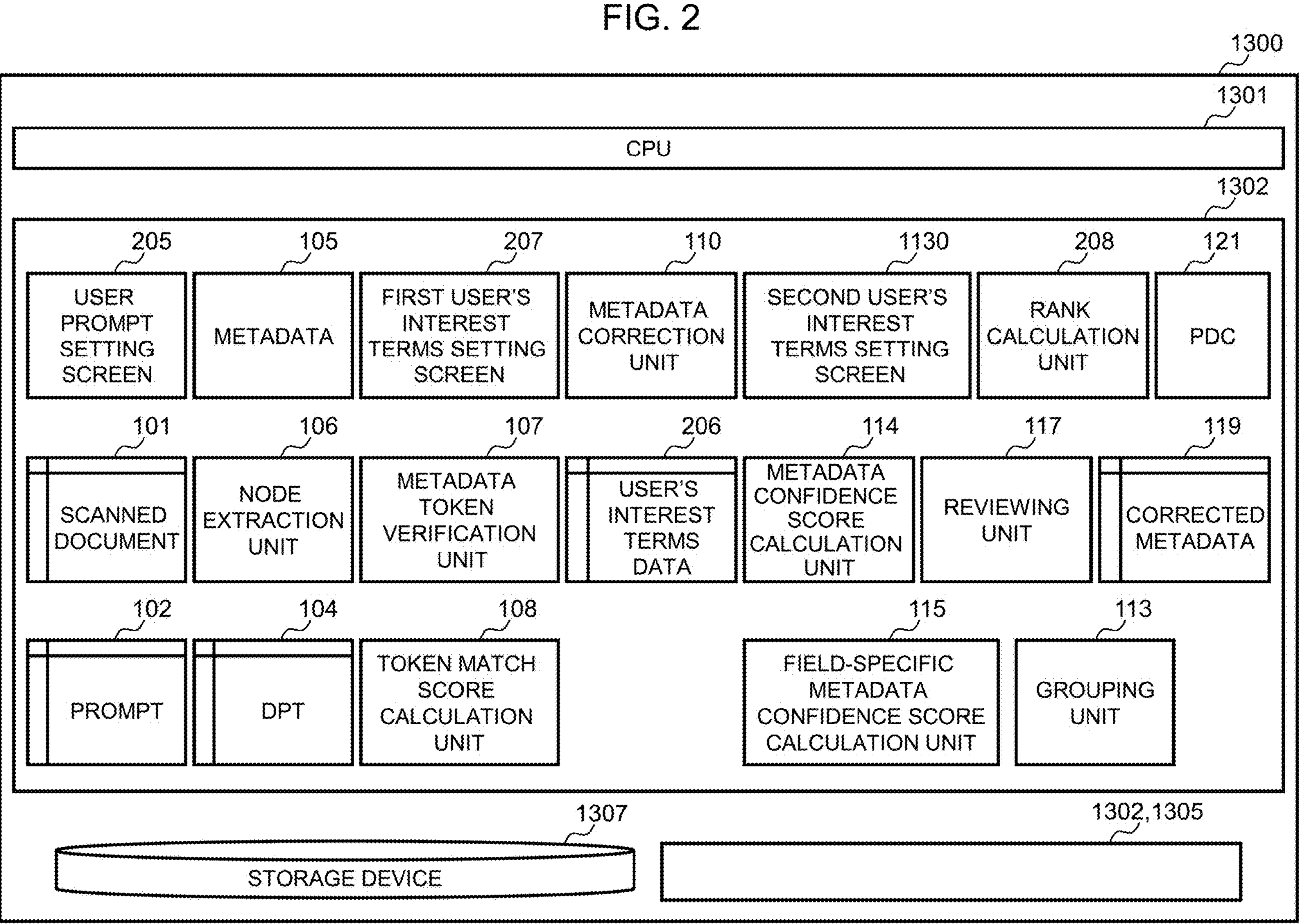
FIG. 2
1300
1301
CPU
1302
205
USER PROMPT SETTING SCREEN
105
METADATA
207
FIRST USER'S INTEREST TERMS SETTING SCREEN
110
METADATA CORRECTION UNIT
1130
SECOND USER'S INTEREST TERMS SETTING SCREEN
208
RANK CALCULATION UNIT
121
PDC
101
SCANNED DOCUMENT
106
NODE EXTRACTION UNIT
107
METADATA TOKEN VERIFICATION UNIT
206
USER'S INTEREST TERMS DATA
114
METADATA CONFIDENCE SCORE CALCULATION UNIT
117
REVIEWING UNIT
119
CORRECTED METADATA
102
PROMPT
104
DPT
108
TOKEN MATCH SCORE CALCULATION UNIT
115
FIELD-SPECIFIC METADATA CONFIDENCE SCORE CALCULATION UNIT
113
GROUPING UNIT
1307
STORAGE DEVICE
1302,1305

133
SECOND USER'S INTEREST TERMS SETTING SCREEN
1130
1101
1101A
1101B
1101C
1101D
1101E
GROUPING BASED ON OUTPUT OF "TERM OF INTEREST"
1102
REVIEW GROUP
A
⋮
Z 117
1200
CONFIDENCE SCORE BASED METADATA REVIEW SCREEN
OUTPUT: THIRD METADATA
1201A
1201B
1201C
1201Y
1201
1201Z
DOCUMENT ID
FIRST FIELD CONFIDENCE SCORE
SECOND FIELD CONFIDENCE SCORE
...
TOTAL METADATA CONFIDENCE SCORE
CORRECTION
$D_1$
0.3
$D_{15}$
0.35
$D_n$
0.6

DATA CREATION APPARATUS AND DATA CREATION METHOD

CROSS-REFERENCE TO PRIOR APPLICATION

This application relates to and claims the benefit of priority from Japanese Patent Application number 2024-124469, filed on Jul. 31, 2024 the entire disclosure of which is incorporated herein by reference.

BACKGROUND OF THE INVENTION

1. Field of the Invention

The present invention is suitable for application to a data creation apparatus and a data creation method relating to a technique for generating metadata from unstructured documents using a large-scale language model (hereinafter also referred to as "LLM").

2. Description of the Related Art

In recent years, an advanced technique for ensuring confidence in metadata generated from unstructured documents using LLMs (large language models) has been developed. To ensure the confidence of the generated metadata, it is important to accurately extract necessary attribute information from the unstructured documents and generate the metadata. Such methods for ensuring the confidence of metadata involve many steps to verify the metadata. For example, in a first step, dependency parse tree (DPT) analysis is used for preliminary verification. This step ensures that the generated metadata faithfully represents the context, taking into account the syntactic complexity of text. Thereafter, in a second step, expert users called data stewards perform critical reviews on the basis of their expertise. Thereby, a layer of metadata validation is added, and thorough investigation of metadata with uncertain consistency is ensured (see, for example, PTL 1 and PTL 2). The integration of such expert expertise serves as an important and crucial checkpoint to maintain high-quality generation of metadata.

PATENT LITERATURE

[PTL 1]U.S. patent Ser. No. 11/664,099

[PTL 2]U.S. Patent Application Publication No. 2014/0082091

SUMMARY OF THE INVENTION

However, in the technologies disclosed in PTL 1 and PTL 2, if the confidence of the generated metadata is low, extensive verification by an expert is required, especially if dealing with large volumes of unstructured documents, and the burden of monitoring by experts is heavy.

The present invention has been made in consideration of the above points, and proposes a data creation apparatus and a data creation method which are capable of generating more accurate metadata from an unstructured document using a large language model, thereby reducing the effort of manually correcting the metadata afterwards.

In order to solve such problems, the present invention provides a data creation apparatus including a node extraction unit which extracts a node on a trace path of a dependency analysis tree based on an input document, a token verification unit which performs token verification to verify whether metadata generated by inputting the document into a large language model is appropriate or not using the metadata and a token obtained from the nodes, a token match score calculation unit which obtains a token match score on the basis of on a result of the token verification, a grouping unit which groups the metadata in accordance with user's interest terms data which reflects a user's interests using the metadata as it is if the token match score satisfies a predetermined condition, a confidence score calculation unit which calculates a confidence score for the grouped metadata, a rank calculation unit which ranks the metadata in accordance with the confidence score, and a reviewing unit which displays the ranked metadata on a rank display screen together with the rank.

Further, the present invention provides a data creation method including a node extraction step in which a node extraction unit extracts a node on a trace path of a dependency analysis tree based on an input document, a token verification step in which a token verification unit performs token verification to verify whether metadata generated by inputting the document into a large language model is appropriate or not using the metadata and a token obtained from the nodes, a token match score calculation step in which a token match score calculation unit obtains a token match score on the basis of a result of the token verification, a grouping step in which a grouping unit groups the metadata in accordance with user's interest terms data which reflects a user's interests using the metadata as it is if the token match score satisfies a predetermined condition, a confidence score calculation step in which a confidence score calculation unit calculates a confidence score for the grouped metadata, a rank calculation step in which a rank calculation unit ranks the metadata in accordance with the confidence score, and a display step in which a reviewing unit displays the ranked metadata on a rank display screen together with the rank.

According to the present invention, it is possible to generate more accurate metadata from an unstructured document using a large language model, thereby reducing the effort of manually correcting the metadata afterwards.

BRIEF DESCRIPTION OF THE DRAWINGS

FIG. 1 is a system configuration diagram showing a configuration example of a data creation system including a data creation server as an example of a data creation apparatus according to a first embodiment;

FIG. 2 is a functional block diagram showing a configuration example of a data creation server;

DESCRIPTION OF THE PREFERRED EMBODIMENTS

Figure 3:
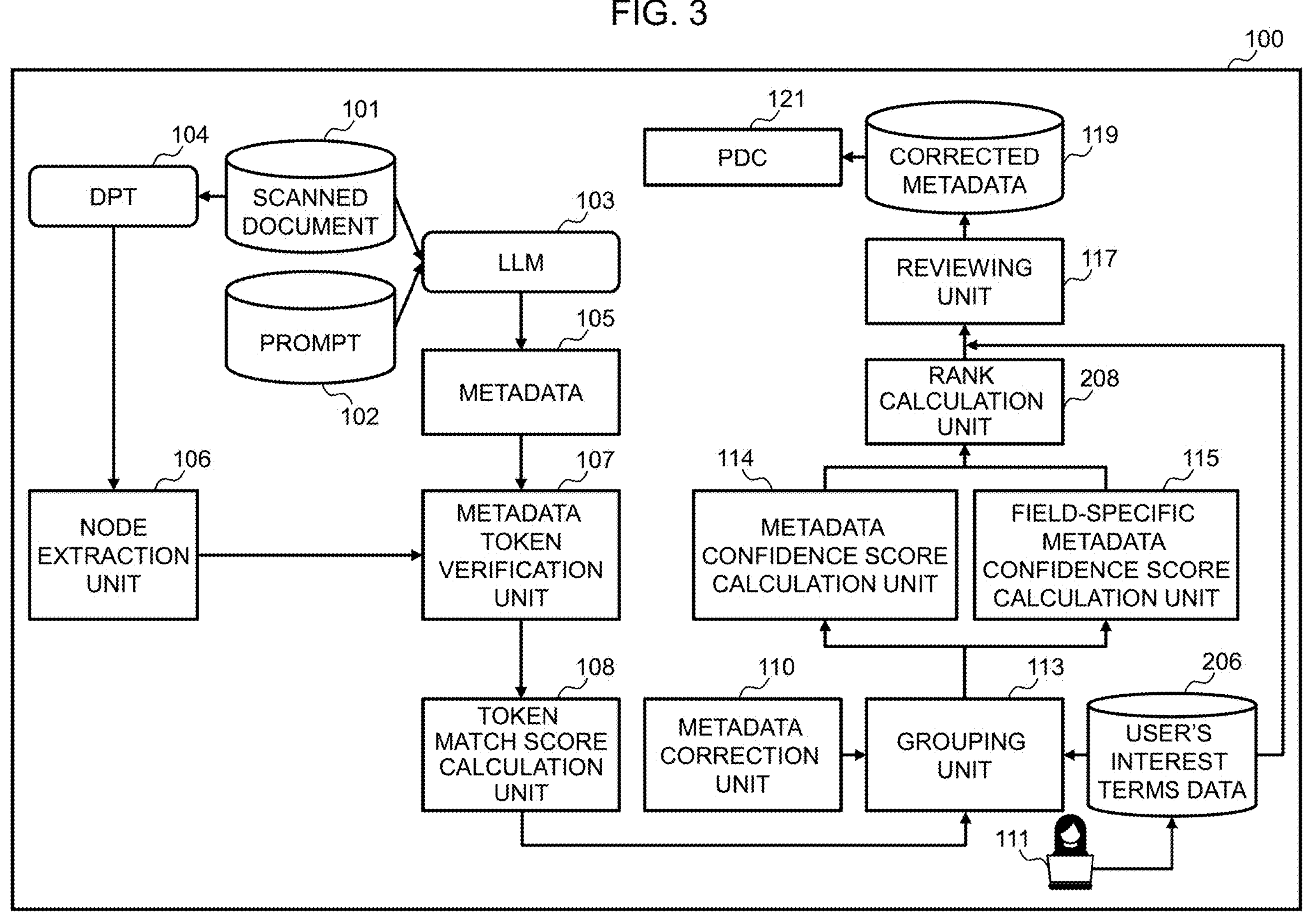
FIG. 3 is a conceptual diagram showing an example of a conceptual procedure of a data creation method performed by a data creation server.

Hereinafter, an embodiment of the present invention will be described in detail with reference to the drawings.

(1) First Embodiment

FIG. 1 is a system configuration diagram showing a configuration example of a data creation system 1400 including a data creation server 1300 as an example of a data creation apparatus according to the first embodiment. The data creation system 1400 includes the data creation server 1300, a client computer (hereinafter simply referred to as a "client") 1330, and a network 1320. The data creation server 1300 and the client 1330 are coupled to each other via the network 1320.

The data creation server 1300 includes a central processing unit (CPU) 1301, an input interface (hereafter simply referred to as an "I/F") 1302, an output I/F 1303, a memory 1304, a communication unit 1305, and a storage device 1307. The memory 1304 includes a volatile memory element such as a random access memory (RAN) and stores programs executed by the CPU 1301. The storage device 1307 is a non-volatile memory device such as a hard disk drive (HDD) or a solid state drive (SSD), and stores programs and data in a non-volatile manner.

The storage device 1307 includes, for example, a metadata token verification program 1308, a metadata token correction program 1309, a confidence score calculation program 1310, and a database 1311. The storage device 1307 has programs with other functions, which will be described later, but the description is omitted here.

The metadata token verification program 1308 has a function of executing verification of tokens related to metadata 105. Details of the metadata token verification program 1308 will be described later.

The metadata token correction program 1309 has a function of correcting a token related to the metadata 105. Details of the metadata token correction program 1309 will be described later.

The confidence score calculation program 1310 has a function of calculating a confidence score. Details of the confidence score calculation program 1310 will be described later.

The database 1311 includes the metadata 105, a scanned document 101, and a dependency parse tree (hereinafter also referred to as an "DPT") 104. The scanned document 101 is a document in a text format prepared in advance. The document is, for example, a so-called unstructured document.

The metadata 105 is data generated from the scanned document 101 using a large language model (hereinafter also referred to as an "LLM"), the details of which will be described later. The metadata 105 is information on predetermined attributes such as gender and age.

The DPT 104 is one of methods of analyzing the structure of a sentence in natural language processing, and specifically, expresses a dependency between words in the sentence as a tree structure. The tree structure indicates, for example, a relationship between words which configure a sentence included in the scanned document 101. This tree structure indicates, for example, a dependency between a subject, a predicate, an object, and the like of the sentence. The DPT 104 is used to grasp the grammatical structure of the sentence. The grammatical structure includes a trace path which indicates connection between nodes, which are, for example, words.

FIG. 2 is a functional block diagram showing a configuration example of the data creation server 1300. In the example shown in the drawing, some components such as the storage device 1307 are omitted for convenience of description. The data creation server 1300 includes, as hardware, the central processing unit (hereinafter also referred to as an "CPU") 1301, the memory 1304, the storage device 1307, and the communication unit 1305 including a network interface.

The CPU 1301 reads out programs and data from the storage device 1307 into a storage area of the memory 1304 and executes the programs while using the data. The programs have a function of performing calculation using the data and displaying a calculation result on a display device (not shown).

The memory 1304 includes, as the above-described data, a user prompt setting screen 205, the scanned document 101, a prompt 102, the generated metadata 105, the dependency parse tree (DPT) 104, a user's interest terms setting screen 207, a token match score calculation unit 108, user's interest terms data 206, an interest term cluster display screen, a Pentaho data catalogue (PDC) 121, and corrected metadata 119. The corrected metadata 119 may also be referred to as the corrected metadata 105.

In the present embodiment, the metadata 105 includes, for example, a combination of a key representing the attribute of each field and the value of the attribute. Examples of the attribute of each field include patient information, prescription drug information, and prescription conditions. The PDC 121 is a data catalog which is configured with a combination of the attribute of each field and the value thereof included in a large number of pieces of metadata 105, and the attribute of each field and the value thereof of each piece of metadata 105 can be searched for using a not shown predetermined application programming interface (API). The PDC 121 can reflect the attribute of each field and the value thereof of new metadata 105. Thus, whether the metadata 105 is appropriate or not affects the confidence of the content of the PDC 121.

Furthermore, the memory 1304 includes, as the above-described programs, a node extraction unit 106, a metadata token verification unit 107, a token match score calculation unit 108, a confidence score verification unit, a rank calculation unit 208, and a reviewing unit 117, and preferably further includes a metadata correction unit 110. The confidence score verification unit includes a metadata confidence score calculation unit 114 and a field-specific metadata confidence score calculation unit 115.

The node extraction unit 106 extracts a node on a trace path of the DPT 104 as a dependency analysis tree based on an input document.

The token verification unit 107 performs token verification to verify whether the metadata 105 generated by inputting a document into a large language model is appropriate or not using the metadata 105 and a token obtained from the above nodes. The metadata 105 is attribute information such as gender.

The token match score calculation unit 108 obtains a token match score on the basis of the result of the token verification performed by the token verification unit 107.

The token match score indicates, for example, how valid the contents of the metadata 105 are when considering the nodes on the trace path of the dependency parse tree (DPT 104) based on the input document. Thus, a higher token match score indicates higher validity, and a lower token match score indicates lower validity.

If the token match score exceeds a threshold value a, which is an example of a predetermined condition, a grouping unit 113 uses the metadata 105 as it is, and groups the metadata 105 in accordance with the user's interest terms data 206 which reflects the interests of users such as a data steward 111.

The confidence score calculation unit calculates a confidence score for the grouped metadata 105. The metadata 105 includes fields corresponding to attributes. The confidence score calculation unit includes the metadata confidence score calculation unit 114 and the field-specific metadata confidence score calculation unit 115. The metadata confidence score calculation unit 114 calculates a confidence score for the entire metadata 105. The field-specific metadata confidence score calculation unit 115 calculates a confidence score for each field of the metadata 105.

The rank calculation unit 208 ranks the metadata 105 in accordance with the confidence score. The reviewing unit 117 displays the ranked metadata 105 on a rank display screen together with the rank.

The data creation server 1300 includes the metadata correction unit 110 which corrects the metadata 105 if the token match score does not satisfy a predetermined condition (for example, exceeding a threshold value a).

The metadata correction unit 110 corrects the metadata 105 on the basis of the trace path of the DPT 104 and the nodes on the trace path, for example, in consideration of each word, which is each node, and the context between the words before and after it.

The node extraction unit 106 extracts a node on the trace path of the DPT 104 on the basis of matching results of parts of speech (hereinafter also referred to as "PoS") of the metadata 105.

In the present embodiment, the rank calculation unit 208 ranks the metadata 105 on the basis of the user's interest terms data 206 and the confidence score.

FIG. 3 is a conceptual diagram showing an example of a conceptual procedure of a data creation method performed by the data creation server 1300. The data creation server 1300 executes a data creation process as follows.

Firstly, the outline of the data creation method includes a node extraction step in which the node extraction unit 106 extracts a node on the trace path of the DPT 104 based on an input document, a token verification step in which the token verification unit 107 performs token verification to verify whether the metadata 105 generated by inputting the document into a large language model 103 is appropriate or not using the metadata 105 and a token obtained from the nodes, a token match score calculation step in which the token match score calculation unit 108 obtains a token match score on the basis of the result of the token verification, a grouping step in which the grouping unit 113 uses the metadata 105 as it is if the token match score satisfies a predetermined condition (for example, exceeding a threshold value a) to group the metadata 105 in accordance with the user's interest terms data 206 in which the interests of users such as the data steward 111 are reflected, a confidence score calculation step in which the confidence score calculation unit calculates a confidence score for the grouped metadata 105, a rank calculation step in which the rank calculation unit 208 ranks the metadata 105 in accordance with the confidence score, and a display step in which the ranked metadata 105 is displayed on a rank display screen together with the rank.

More specifically, the scanned document 101 is input to the LLM 103, and the node extraction unit 106 extracts a node of the trace path for obtaining a token for the scanned document 101 using the DPT 104.

The prompt 102 includes a command to create metadata from the scanned document 101. If the prompt 102 and the scanned document 101 are input to the LLM 103, the LLM 103 generates metadata 105. This metadata 105 includes a combination of a key indicating the attribute of each field extracted from the scanned document 101 and the value of the attribute.

The metadata token verification unit 107 performs token verification on the basis of the nodes extracted by the node extraction unit 106 and the metadata 105.

The token match score calculation unit 108 compares the token match score with a predetermined threshold value a on the basis of the result of the token verification performed by the metadata token verification unit 107. If the token match score calculation unit 108 determines which the token match score is greater than the predetermined threshold value a, the token match score calculation unit 108 executes a grouping process, whereas if the token match score calculation unit 108 does not determine that the token match score is greater than the predetermined threshold value a, the token match score calculation unit 108 executes a metadata correction process S110 and then performs a grouping process.

The grouping unit 113 executes a grouping process to be described later for each piece of metadata 105 in accordance with the user's interest terms data 206 reflecting a user's intention such as the data steward 111. In the grouping process, each piece of metadata 105 is classified by grouping.

The metadata confidence score calculation unit 114 calculates a confidence score in units of metadata, for example. The field-specific metadata confidence score calculation unit 115 calculates a confidence score for each field of the metadata.

The rank calculation unit 208 calculates a rank on the basis of the calculated confidence score in units of metadata and the confidence score for each field. The rank calculation unit 208 may calculate a rank in units of groups, for example.

The reviewing unit 117 performs reviewing by displaying a confidence score based metadata review screen, which will be described later, using, for example, a graphic user interface (GUI) and ranks the metadata 105 on the basis of the calculated confidence score. In the present embodiment, the reviewing is, for example, determining whether the metadata 105 generated from the document 101 is appropriate or not.

The reviewing unit 117 determines whether the metadata 105 is appropriate or not and needs to be corrected on the basis of the ranked metadata 105. If it is determined that the metadata 105 does not need to be corrected, the metadata 105 is reflected in the PDC 121. Meanwhile, if it is determined that the metadata needs to be corrected, the metadata correction unit 110 corrects the metadata 105 to create corrected metadata 119, and the corrected metadata 119 is reflected in the PDC 121.

Figure 4:
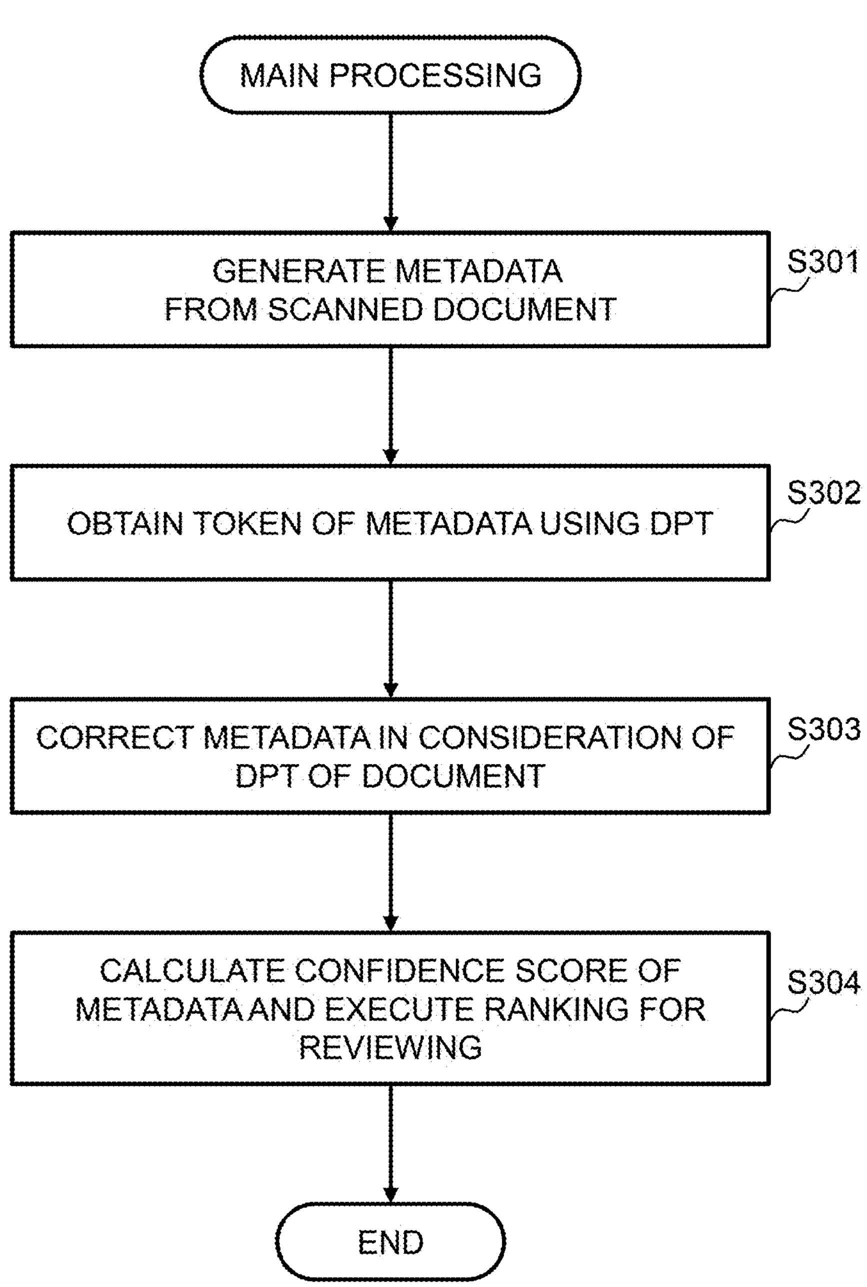
FIG. 4 is a flowchart showing an example of a procedure of main processing.

FIG. 4 is a flowchart showing an example of a procedure of main processing. The main processing is an example of a data creation method according to the present embodiment.

In step S301, a metadata generation process for generating metadata 105 from the scanned document 101 in accordance with the input prompt 102 is performed. In step S302, a token of the metadata 105 is obtained using the DPT 104, and a metadata token verification process is executed.

In step S303, a metadata correction process for correcting the metadata 105 on the basis of the nodes on the trace path of the DPT 104 of the document 101 is executed. In step S304, a confidence score calculation process for calculating the confidence score of the metadata, and a ranking calculation process for executing ranking for reviewing are executed.

Figure 5:
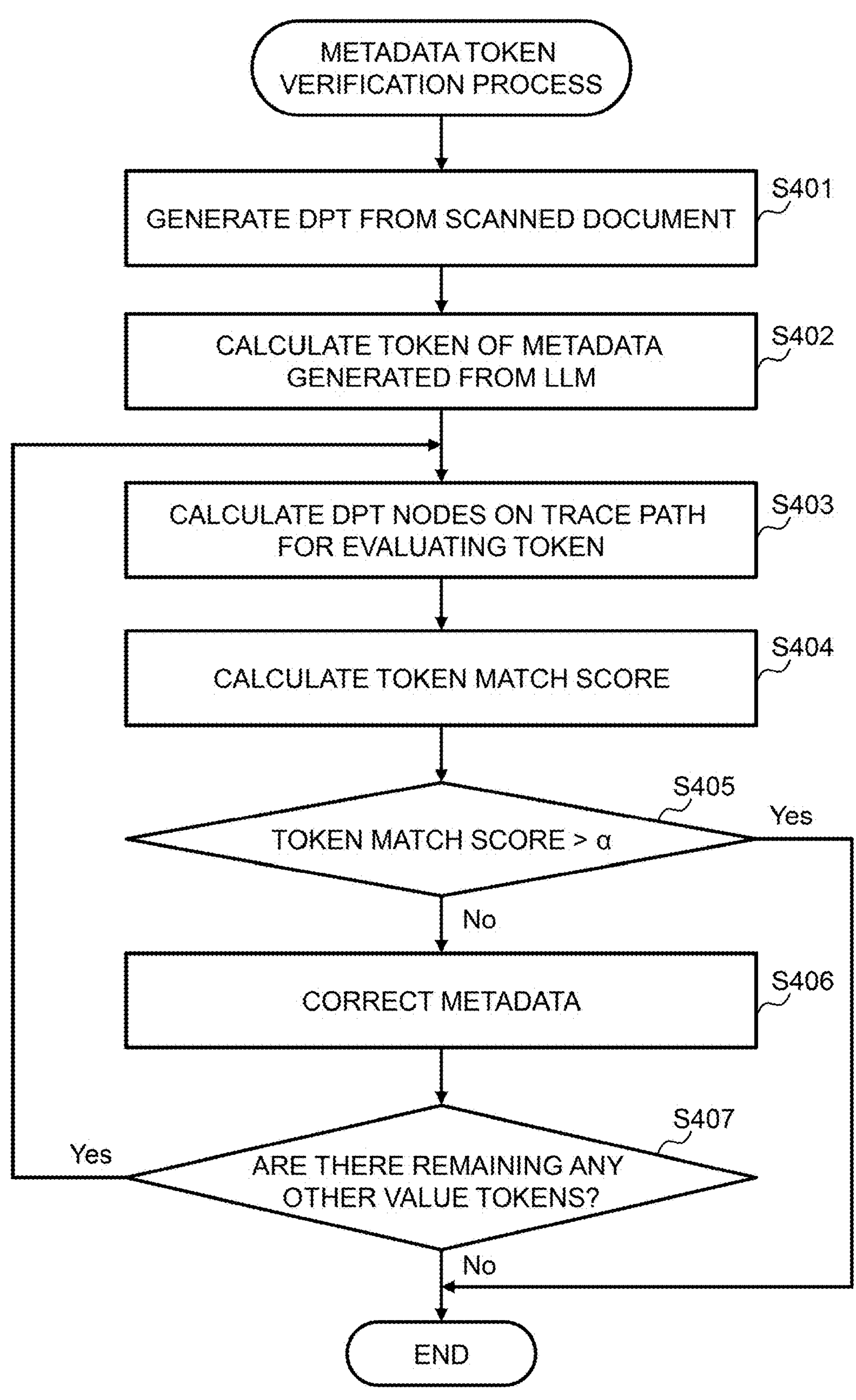
FIG. 5 is a flowchart showing an example of a procedure of a metadata token verification process.

FIG. 5 is a flowchart showing an example of a procedure of the metadata token verification process. The metadata token verification process is executed by the metadata token verification unit 107.

In step S401, the metadata token verification unit 107 generates a DPT 104 from the scanned document 101. The DPT 104 is useful for identifying grammatical dependencies between words and relational analysis of text. In step S402, the metadata token verification unit 107 calculates a token configured with a combination of a key of the metadata 105 generated from the LLM 103 and the value thereof.

In step S403, the metadata token verification unit 107 calculates nodes on the trace path of the DPT 104 to evaluate the token. Specifically, first, the metadata token verification unit 107 calculates which node (for example, a word) on the trace path of the DPT 104 corresponds to the token of the metadata 105. For example, a token which includes a value can also be referred to as a value token. Next, the metadata token verification unit 107 searches for a leaf node which starts with a token on the trace path of the DPT 104. The metadata token verification unit 107 traces the DPT 104 to confirm the trace path from the token to a parent node of the uppermost part of the DPT 104, thereby confirming whether the metadata 105 is appropriate or not, that is, whether a correct usage and terminology are used in the context of the document 101.

In step S404, the token match score calculation unit 108 calculates a token match score. By calculating the token match score, the token match score calculation unit 108 determines to what extent the token of the metadata 105 matches a node on the trace path of the DPT 104.

In step S405, the metadata token verification unit 107 determines whether the token match score is greater than a predetermined threshold value a as a predetermined condition. If it is determined in step S405 that the token match score is greater than the predetermined threshold value a, the metadata token verification unit 107 determines that the metadata 105 is appropriate and ends the metadata token verification process. Meanwhile, if it is not determined that the token match score is greater than the predetermined threshold value a, the metadata token verification unit 107 executes step S406. In the former case, the accuracy of the metadata 105 extracted from the unstructured document described above can be ensured. In step S406, the metadata correction unit 110 corrects the metadata 105.

In step S407, the metadata token verification unit 107 determines whether any other tokens remain. In step S407, if there are other value tokens remaining, the metadata token verification unit 107 returns to step S403 and executes it from now on, while when there are no other value tokens remaining, the metadata token verification unit 107 executes the metadata token verification process. In the former case, it is possible to ensure comprehensive scrutiny for all pieces of generated metadata 105. Thereby, high accuracy and confidence of the extraction of the metadata 105 are ensured.

Figure 6:
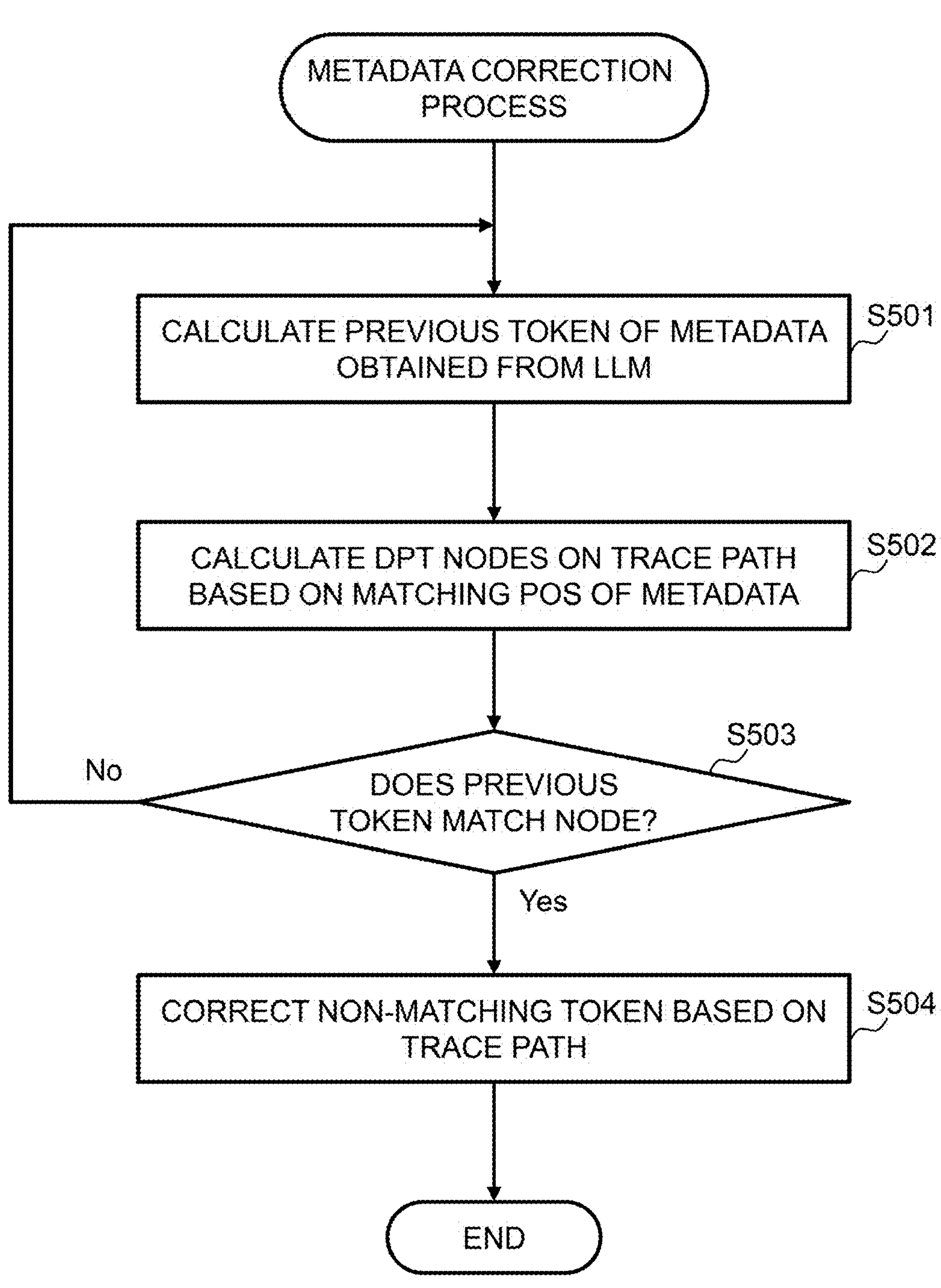
FIG. 6 is a flowchart showing an example of a procedure of a metadata correction process.

FIG. 6 is a flowchart showing an example of a procedure of a metadata correction process. The metadata correction process is executed by the metadata correction unit 110. The drawing shows an example of a metadata correction process applied to metadata 105 which is not determined to be appropriate in the token verification described above. In the metadata correction process, for example, metadata 105 of which the token match score is equal to or smaller than a threshold value a may be removed.

In step S501, the metadata correction unit 110 searches for or calculates a previous token of the metadata 105 obtained from the LLM 103. The previous token is a token which corresponds to a part of the metadata 105 which was previously generated. In step S501, the metadata correction unit 110 identifies and extracts a token which is calculated immediately before the metadata 105 which is currently being processed, for example.

In step S502, the metadata correction unit 110 calculates DPT nodes on the trace path based on the matching PoS of the metadata. In step S502, the metadata correction unit 110 analyzes the grammatical structure of the metadata 105, for example, to ensure consistency between different word fragments on the basis of the matching result of the PoS of the metadata 105. In step S502, the metadata correction unit 110 specifies relevant nodes (significant points or elements in a structured path) determined in accordance with the matching result of the PoS of the metadata 105. This specification process is crucial to maintain the grammatical and semantic structure of the metadata 105.

In step S503, the metadata correction unit 110 checks the consistency between the previous token and the node on the trace path by determining whether the previous token (for example, a value) matches the node (for example, word) on the trace path of the DPT 104. If the previous token does not match the node, the metadata correction unit 110 returns to and executes step S501 described above. Meanwhile, if the previous token matches the node, the metadata correction unit 110 executes step S504.

In step S504, the metadata correction unit 110 corrects, for example, a token which the data steward 111 does not match, on the basis of the trace path. This correction is performed on the basis of the previously used trace path and includes replacing, modifying, or updating the tokens of the metadata 105 to ensure that they match the established trace path. That is, if a previously extracted token does not match an expected token on the trace path, the mismatched token is corrected. This correction ensures the consistency and accuracy of the metadata 105.

Figure 7:
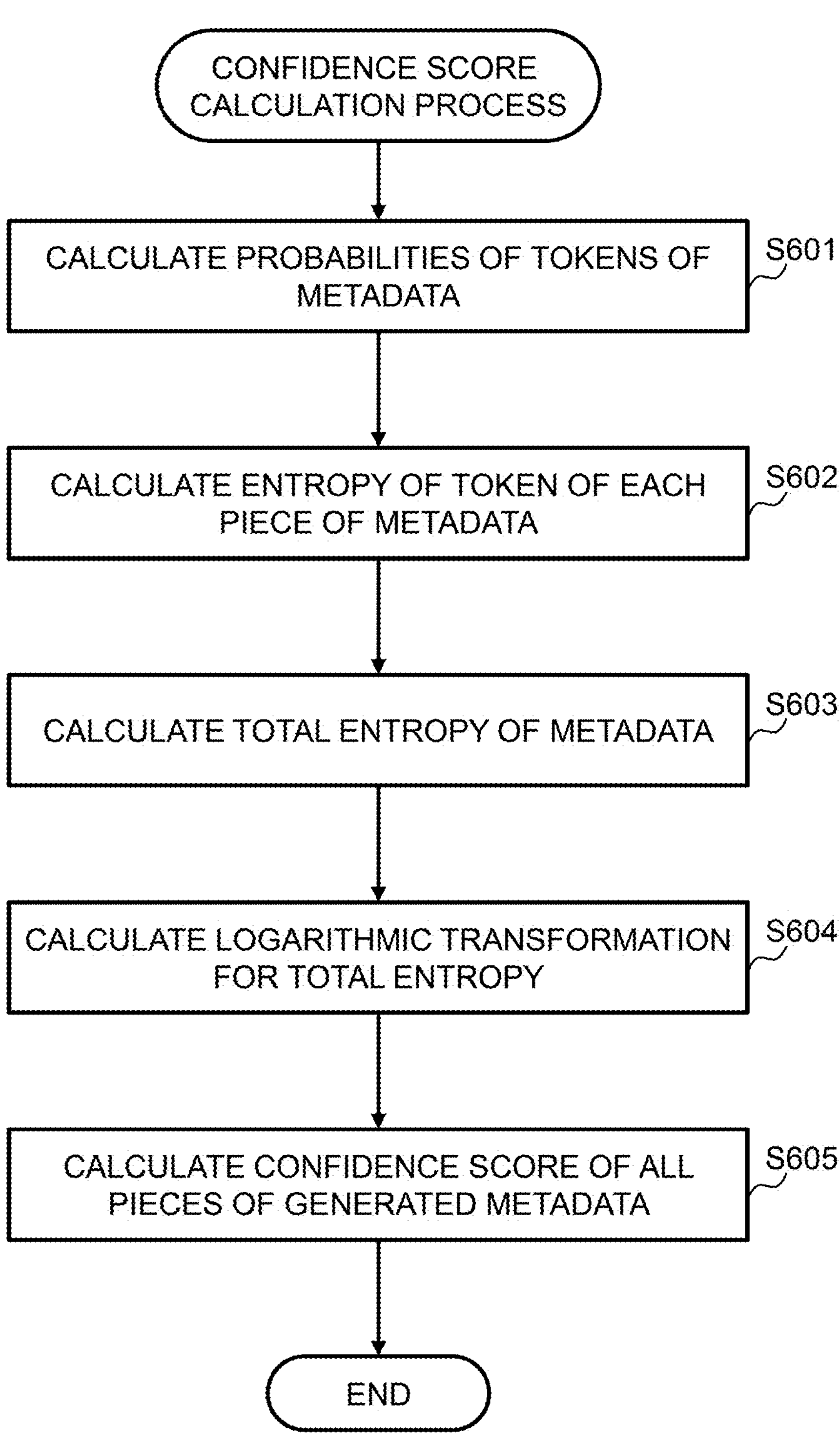
FIG. 7 is a flowchart showing an example of a procedure of a confidence score calculation process.

FIG. 7 is a flowchart showing an example of a procedure of a confidence score calculation process. The confidence score calculation process is executed by the metadata confidence score calculation unit 114.

In step S601, the metadata confidence score calculation unit 114 calculates the probabilities of the tokens of the metadata 105. The "probabilities" mentioned here include, for example, evaluating the extent to which the value of an attribute of each field of the metadata 105 is structurally appropriate, such as grammatically, or whether the value is related to a certain document, on the basis of previous data, patterns, or predictions of trained models.

In step S602, the metadata confidence score calculation unit 114 calculates the entropy of the token of each piece of metadata 105. At this point, the entropy is a measure of the uncertainty or unpredictability of each piece of metadata 105, for example. A high entropy indicates a wide range of possible values for the token, and a low entropy indicates higher certainty for the value of the token.

In step S603, the metadata confidence score calculation unit 114 calculates the total entropy of the metadata 105. The metadata confidence score calculation unit 114 aggregates the entropy values based on the tokens of all pieces of metadata to calculate a total entropy of the entire set of metadata 105. The total entropy reflects the overall uncertainty of the set of metadata 105 and is an important factor when determining a confidence score.

In step S604, the metadata confidence score calculation unit 114 calculates logarithmic transformation as a mathematical operation for the total entropy. This mathematical operation is a method for making the total entropy value more interpretable or manageable, particularly when the total entropy value spans several orders of magnitude. The total entropy is used to perform scaling. The logarithmic transformed total entropy value is used to generate all confidence scores for the entire set of metadata 105.

In step S605, the metadata confidence score calculation unit 114 obtains confidence scores of all pieces of generated metadata 105. The confidence score represents, for example, a quantified level of accuracy and confidence of the metadata 105. This confidence score is crucial for a user's decision-making process regarding the metadata 105. At this point, a lower entropy (low randomness) is subsumed within a higher entropy. The metadata confidence score calculation unit 114 calculates the total entropy as 0.079, for example, by logarithmic transformation. Thereby, the confidence score is calculated as, for example, 1-0.079, as a result of reflecting the lower entropy (low randomness) in the higher entropy.

Figure 8:
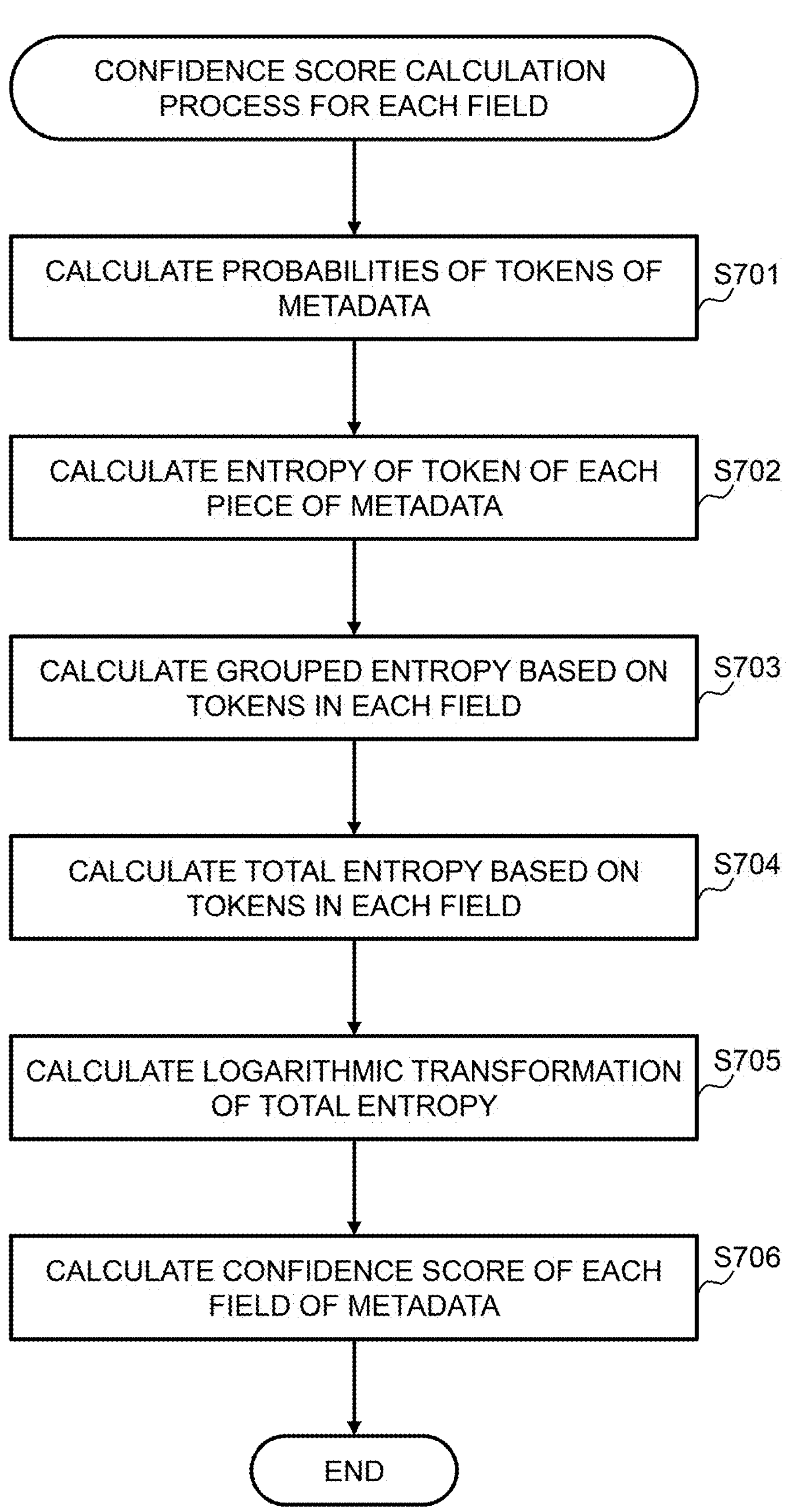
FIG. 8 is a flowchart showing an example of a procedure of a confidence score calculation process for each field.

FIG. 8 is a flowchart showing an example of a procedure of a confidence score calculation process for each field. The flowchart shown in FIG. 8 is substantially the same as the flowchart shown in FIG. 7, except for whether a confidence score is calculated for each piece of metadata 105 or for each field. For this reason, a part of the detailed content which has already been described is omitted. In the confidence score calculation process for each field, the field-specific metadata confidence score calculation unit 115 calculates a confidence score for each field of the metadata 105.

In step S701, the field-specific metadata confidence score calculation unit 115 calculates the probabilities of the tokens of the metadata 105.

In step S702, the field-specific metadata confidence score calculation unit 115 calculates the entropy of the token of each piece of metadata 105.

In step S703, the field-specific metadata confidence score calculation unit 115 calculates the entropy grouped for each group on the basis of the tokens in each field of the metadata 105. For example, each group can be a group for each attribute included in the metadata 105 (for example, patient information, prescription drug information, prescription conditions). Thereby, the variability in a specific field of the metadata 105 is reflected in a confidence score.

In step S704, the field-specific metadata confidence score calculation unit 115 calculates a total entropy of all fields on the basis of the tokens in each field. Thereby, an overall confidence score across each field of the metadata 105, rather than the entire metadata 105, is obtained.

In step S705, the field-specific metadata confidence score calculation unit 115 calculates the logarithmic transformation of the total entropy. In step S706, the field-specific metadata confidence score calculation unit 115 calculates a confidence score of each field of the metadata 105.

Figure 9:
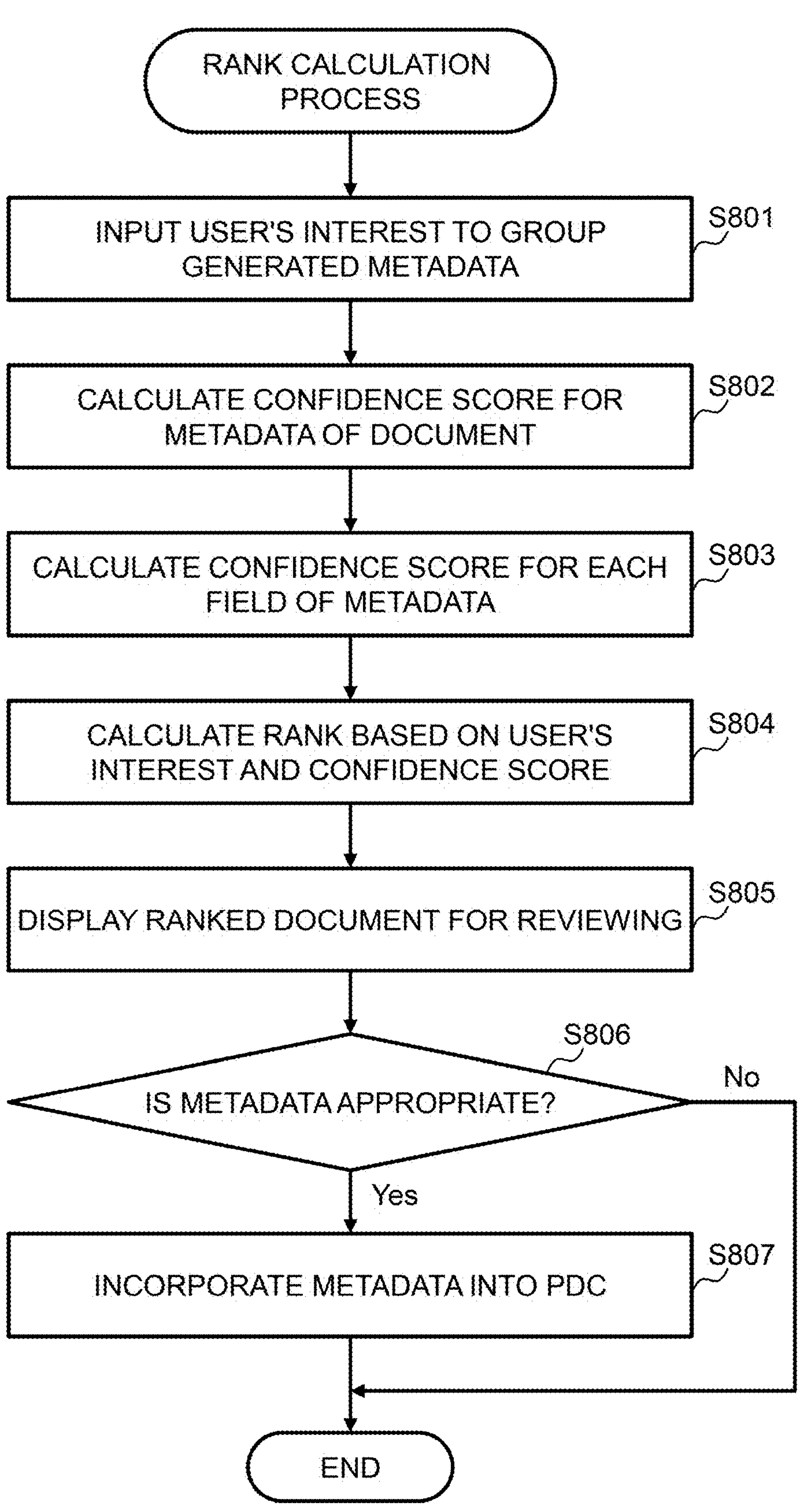
FIG. 9 is a flowchart showing an example of a procedure of a rank calculation process.

FIG. 9 is a flowchart showing an example of a procedure of a rank calculation process. The rank calculation process is executed by the rank calculation unit 208. In the rank calculation process, a rank is calculated for reviewing using a confidence score and a user's interest.

In step S801, if the generated metadata 105 is grouped, the user's interest is input (see, for example, FIG. 10 to be described later). In step S802, the rank calculation unit 208 calculates a confidence score for the entire metadata 105 of the document in accordance with the input user's interest.

In step S803, the rank calculation unit 208 calculates a confidence score for each field of the metadata 105.

In step S804, the rank calculation unit 208 calculates a rank in consideration of both the user's interest and the confidence score. By considering both in this manner, both the statistical confidence of the metadata 105 and a specific purpose according to the user's interest are reflected in the ranking. In step S805, the rank calculation unit 208 displays the ranked metadata 105 for reviewing. Such a visual display allows the user to easily understand a ranking result and determine whether the metadata 105 is appropriate or not on the basis of the evaluated quality of the metadata 105.

In step S806, the rank calculation unit 208 determines whether the metadata 105 is appropriate or not. If the metadata 105 is appropriate in step S806, the rank calculation unit 208 allows the user to review the metadata 105 and executes step S807 to end the rank calculation process. Meanwhile, if the metadata 105 is not appropriate in step S806, the rank calculation unit 208 ends the rank calculation process. In step S807, the metadata 105 is incorporated into the PDC 121.

Figure 10:
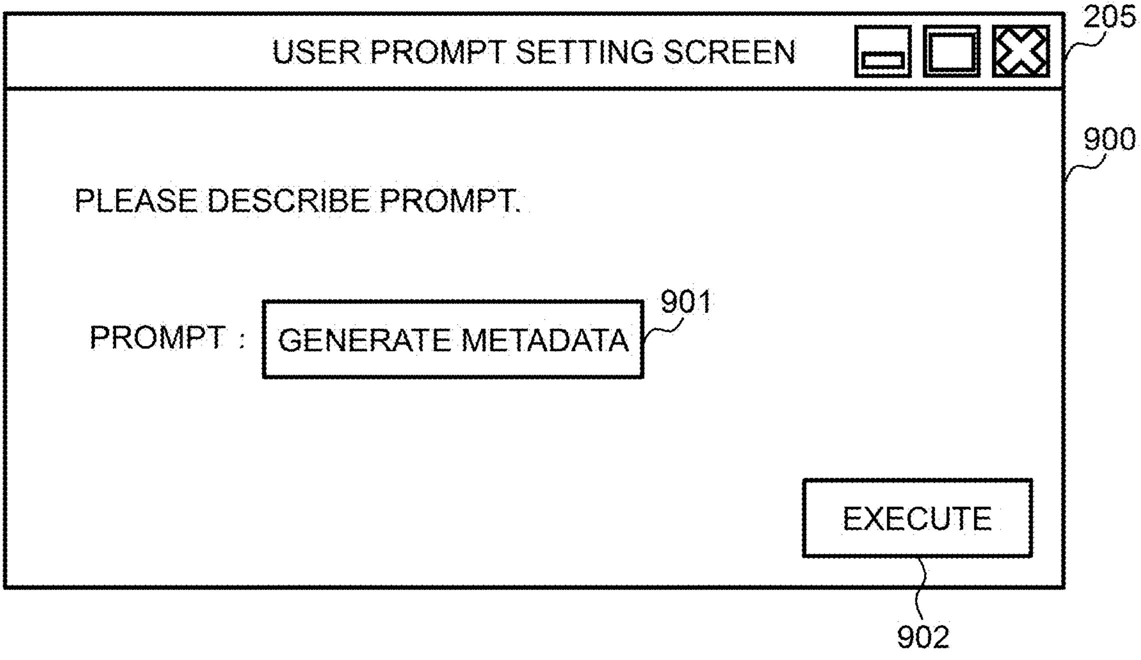
FIG. 10 is a diagram showing an example of a user prompt setting screen.

FIG. 10 is a diagram showing an example of a user prompt setting screen 205. The user prompt setting screen 205 is a screen for describing a prompt for generating metadata 105 using the LLM 103.

The user prompt setting screen 205 is, for example, a screen using a graphic user interface (GUI). The user prompt setting screen 205 includes, for example, a prompt setting field 900 having a prompt description field 901 and an execute button 902. The prompt description field 901 is an item field for the user to input a desired prompt 102.

The execute button 902 is a button for executing the prompt 102 which is input in the prompt description field 901. If the execute button 902 is operated, the prompt 102 which is input in the prompt description field 901 is input to the LLM 103.

Figure 11:
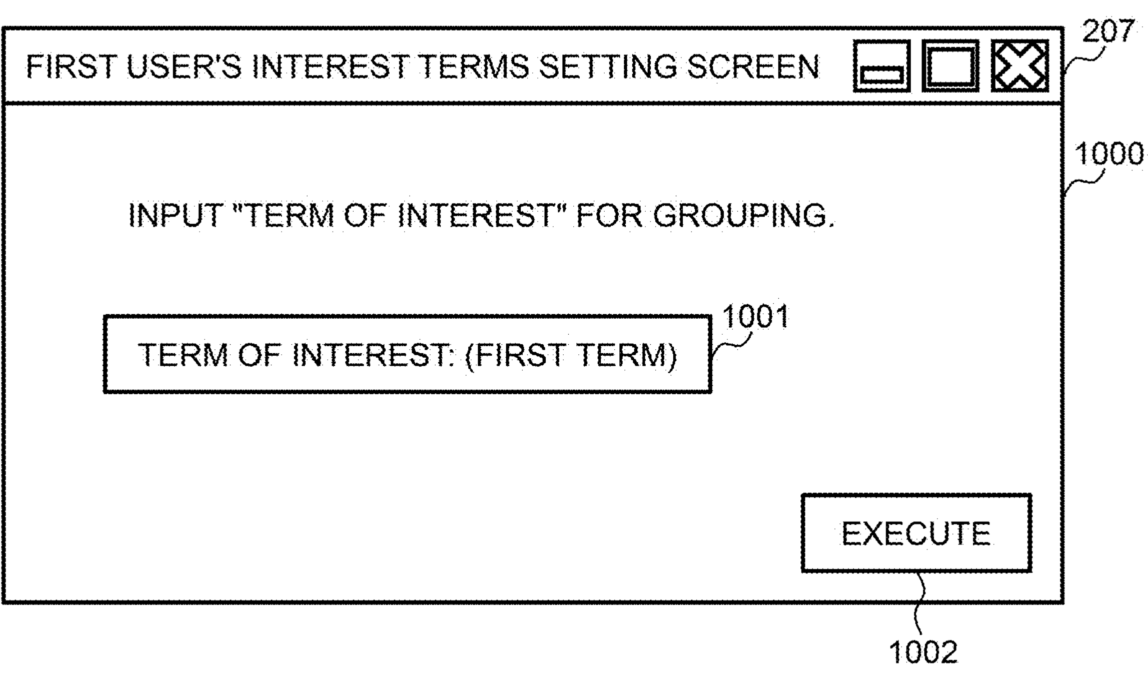
FIG. 11 is a diagram showing an example of a first user's interest terms setting screen.
Figure 12:
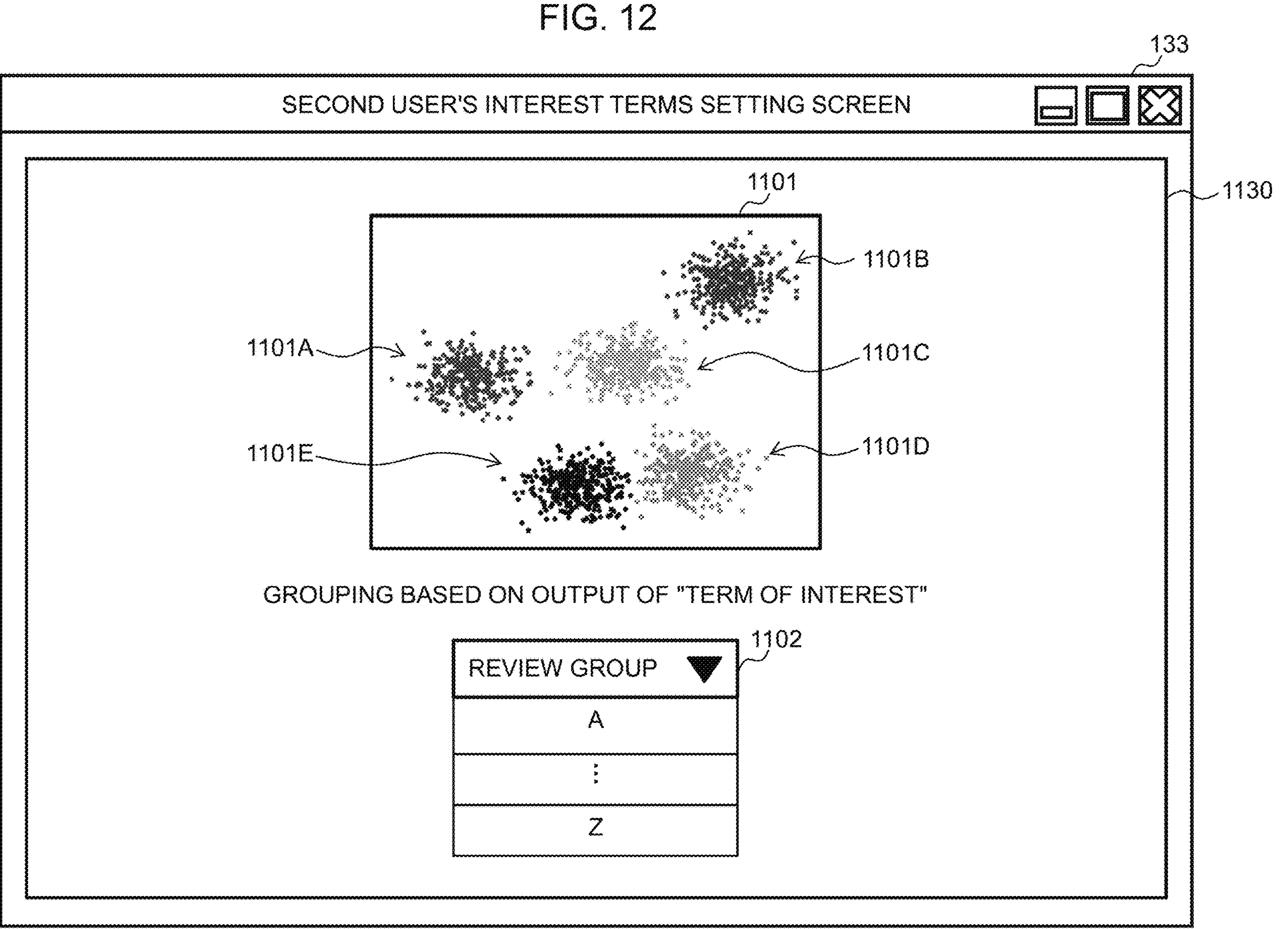
FIG. 12 is a diagram showing an example of a second user's interest terms setting screen.

FIGS. 11 and 12 are diagrams showing an example of the user's interest terms setting screen 207. FIG. 11 is an example of a first user's interest terms setting screen 207, and FIG. 12 is an example of a second user's interest terms setting screen 1130. The user's interest terms setting screen 207 displays grouping of user interest settings for review groups, which are units for reviewing metadata 105.

The first user's interest terms setting screen 207 shown in FIG. 11 includes an input field 1001 for a user, such as the above-described data steward, to input a term of interest and an execute button 1002. If the user inputs a first term (for example, a patient's age) as a term of interest in the input field 1001 and operates the execute button 1002, the first term is reflected in the user's interest terms data 206 and is used if the rank calculation unit 208 executes the above-described rank calculation process.

The second user's interest terms setting screen 1130 shown in FIG. 12 includes a display field 1100 with a grouping mode display field 1101 on the upper side and a review group drop-down menu 1102 on the lower side in the vertical direction.

The grouping mode display field 1101 displays at least one cluster or group of metadata 105 in a different color as a grouping result of the metadata 105 grouped by a review group which is set in the review group drop-down menu 1102. In the example shown in the drawing, a first cluster 1101A to a fifth cluster 1101E are displayed simultaneously.

For example, the clusters represent different groups or categories of the metadata 105, which are organized and displayed on the basis of user-defined "terms of interest". A visualization area includes multicolored dots that represent data or points. The dots represent individual metadata items which have common characteristics, and the classification by color is useful for distinguishment between various groups.

In the upper part of the review group drop-down menu 1102, for example, "Grouping based on output of "interesting terms"" is displayed. The review group drop-down menu 1102 makes it possible to select one review group from among a plurality of review groups. Depending on the selected review group, the grouping mode display field 1101 displays one of the above-described first cluster 1101A to fifth cluster 1101E or a combination of any clusters depending on the selected review group as a grouping result of the metadata 105.

Figure 13:
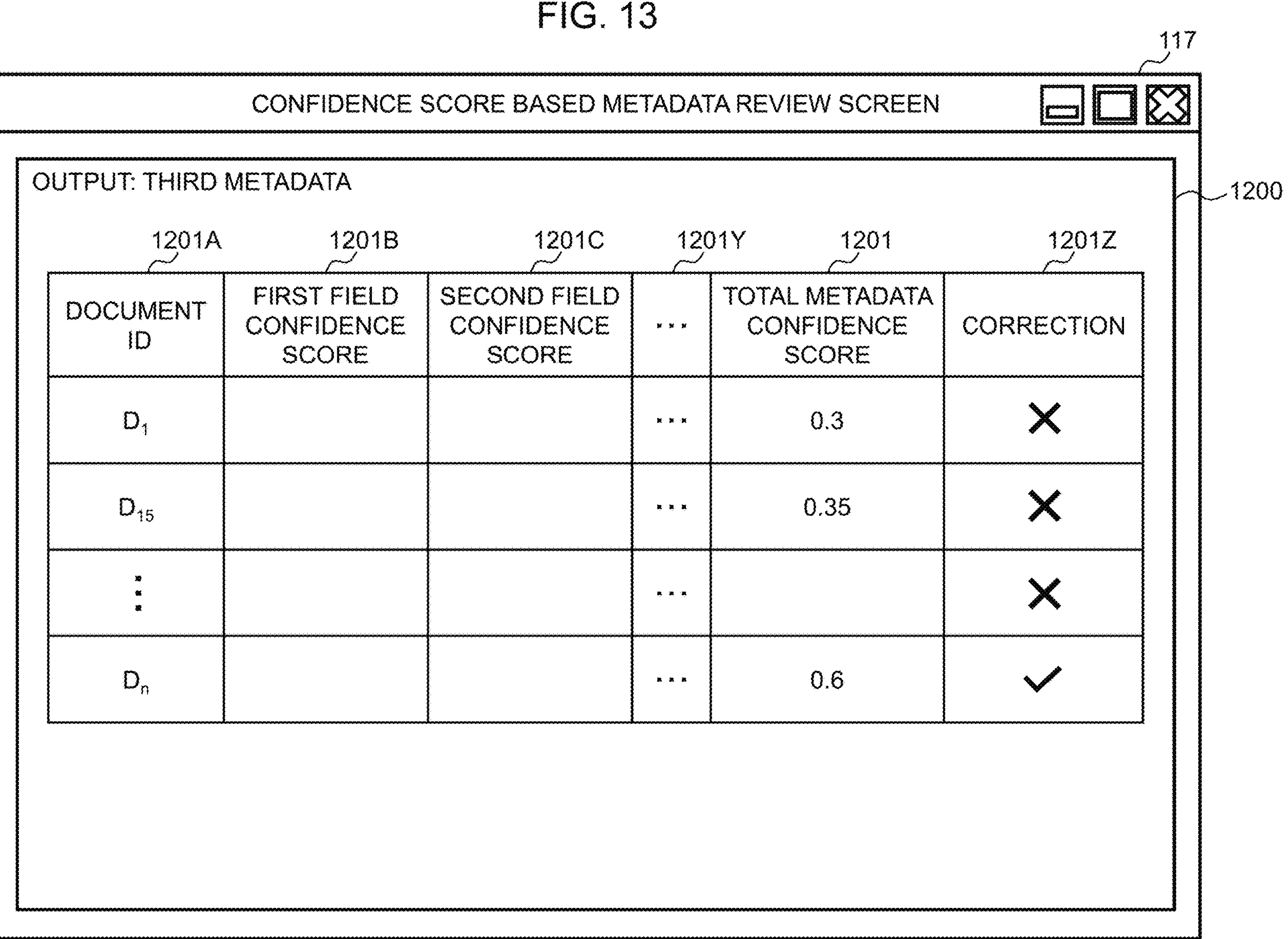
FIG. 13 is a diagram showing an example of a confidence score-based metadata review screen.

FIG. 13 is a diagram showing an example of a confidence score-based metadata review screen (hereafter simply referred to as a "metadata review screen") 117. The metadata review screen shows, for example, an example of reviewing of a document by the data steward 111. The metadata review screen relates to, for example, a confidence score for third metadata as an output.

The metadata review screen includes, as display items in a display area 1201, for example, a document ID (IDentifier) 1201A, a first field confidence score 1201B, a second field confidence score 1201C, . . . , a total metadata confidence score 1201Y, and an execution of correction 1201Z. In the example shown in the drawing, the values of the first field confidence score 1201B and the second field confidence score 1201C are omitted for convenience of description.

The document ID 1201A is an identifier of a document which is the source of generation of the third metadata described above. The first field confidence score 1201B represents a confidence score of a first field among fields of the metadata calculated as described above. The second field confidence score 1201C represents a confidence score of a second field among the fields of the metadata calculated as described above.

The total metadata confidence score 1201Y represents a confidence score for the total metadata calculated as described above. The execution of correction 1201Z indicates whether correction has been performed (corrected) or has not been performed (not corrected). For example, when correction has been performed, a check mark is input, and when correction has not been performed, an X mark is input.

For the execution of correction 1201Z, a check mark or an X mark is input in accordance with the confidence score for the total metadata 105 on the basis of the insight of a user such as the data steward 111. For the execution of correction 1201Z, a check mark or an X mark may be automatically input in accordance with the value of the confidence score for the total metadata.

The data creation server 1300 according to the present embodiment includes the node extraction unit 106 which extracts a node on the trace path of the DPT 104 based on an input document, the token verification unit 107 which performs token verification to verify whether metadata 105 generated by inputting a document to a large language model is appropriate or not using the metadata 105 and a token obtained from the nodes extracted on the basis of the input document, the token match score calculation unit 108 which obtains a token match score on the basis of a result of the token verification, the grouping unit 113 which groups the metadata 105 in accordance with the user's interest terms data 206 which reflects the interest of a user (for example, the data steward 111) using the metadata 105 as it is if the token match score satisfies a predetermined condition, various confidence score calculation units 114 and 115 which calculate a confidence score for the grouped metadata 105, the rank calculation unit 208 which ranks the metadata 105 in accordance with the confidence score, and the reviewing unit 117 which displays the ranked metadata 105 on a rank display screen together with the rank.

With the above configuration, it is possible to generate more accurate metadata 105 from the unstructured document 101 using a large language model, and reduce the effort of manually correcting the metadata 105 afterwards.

In the present embodiment, the metadata 105 includes fields, and the various confidence score calculation units 114 and 115 include the metadata confidence score calculation unit 114 which calculates a confidence score for the entire metadata 105, and the field-specific metadata confidence score calculation unit 115 which calculates a confidence score for each field of the metadata 105. In this manner, it is possible to generate more accurate metadata 105 from the unstructured document 101 using a large language model on the basis of a confidence score for the entire metadata 105 taking into account each field of the metadata 105, and it is possible to reduce the effort of manually correcting the metadata 105 afterwards.

The data creation server 1300 according to the present embodiment includes the metadata correction unit 110 which corrects the metadata 105 if a token match score does not satisfy a predetermined condition. Thereby, it is possible to create the PDC 121 which reflects accurate metadata 105.

In the present embodiment, the metadata 105 includes a combination of a key representing an attribute of each field and the value of the attribute. In this manner, it is possible to generate more accurate metadata 105 on the basis of a confidence score for the metadata 105 which takes into account the key of each field of the metadata 105 and the value thereof, and it is possible to reduce the effort of manually correcting the metadata 105 afterwards.

In the present embodiment, the metadata correction unit 110 corrects the metadata 105 on the basis of the trace path of the DPT 104 and nodes on the trace path. In this manner, it is possible to generate more accurate metadata 105 and reduce the effort of manually correcting the metadata 105 afterwards.

In the present embodiment, the node extraction unit 106 extracts a node on the trace path on the basis of matching results of PoS of the metadata 105. In this manner, it is possible to generate more accurate metadata 105 while taking into account grammatical context, including parts of speech, on the basis of the nodes on the trace path which are extracted from the matching results of the PoS of the metadata, and it is possible to reduce the effort of manually correcting the metadata 105 afterwards.

In the present embodiment, the rank calculation unit 208 ranks the metadata 105 on the basis of the user's interest terms data 206 and a confidence score. In this manner, it is possible to generate more accurate metadata 105 from the ranking results, and to reduce the effort of manually correcting the metadata 105 afterwards.

The present invention is not limited to the above-described embodiment, and includes various modification examples and equivalent configurations within the spirit of the appended claims. For example, the above-described embodiment has been described in detail to describe the present invention in an easy-to-understand manner, and the present invention is not necessarily limited to those having all of the described configurations. In addition, the elements described in parallel in the present embodiment may be in a form in which at least one of the elements is coupled in series to the other elements.

The present invention is applicable, for example, to a data creation apparatus related to a technique for generating metadata from an unstructured document using a large language model.

What is claimed is:

1. A data creation apparatus comprising:

a processor coupled to a memory storing instructions for the processor to execute:

a node extraction unit which extracts a node on a trace path of a dependency analysis tree based on an input document;

a token verification unit which performs token verification to verify whether metadata generated by inputting the document into a large language model is appropriate or by comparing the token obtained from the nodes on the trace path of the dependency analysis tree with the metadata generated by the large language model to confirm correct usage and terminology in a context of the document;

a token match score calculation unit which obtains a token match score on a basis of on a result of the token verification;

a grouping unit which groups the metadata in accordance with user's interest terms data which reflects a user's interests using the metadata as it is if the token match score satisfies a predetermined condition;

a confidence score calculation unit which calculates a confidence score for the grouped metadata;

a rank calculation unit which ranks the metadata in accordance with the confidence score; and a reviewing unit which displays the ranked metadata on a rank display screen together with the rank.

2. The data creation apparatus according to claim 1, wherein the metadata includes each of fields, and the confidence score calculation unit includes:

a metadata confidence score calculation unit which calculates the confidence score for an entire metadata, and a field-specific metadata confidence score calculation unit which calculates the confidence score for each field of the metadata.

3. The data creation apparatus according to claim 2, wherein the field-specific metadata confidence score calculation unit calculates entropy grouped for each group based on tokens in each field of the metadata.

4. The data creation apparatus according to claim 2, wherein the field-specific metadata confidence score calculation unit calculates a total entropy of all fields based on tokens in each field to obtain an overall confidence score across each field of the metadata.

5. The data creation apparatus according to claim 2, wherein the field-specific metadata confidence score calculation unit calculates logarithmic transformation of a total entropy to calculate the confidence score for each field of the metadata.

6. The data creation apparatus according to claim 2, wherein each group corresponds to an attribute included in the metadata.

7. The data creation apparatus according to claim 2, wherein the confidence score represents a quantified level of accuracy and confidence of the metadata.

8. The data creation apparatus according to claim 1, wherein the processor further executes a metadata correction unit which corrects the metadata if the token match score does not satisfy the predetermined condition.

9. The data creation apparatus according to claim 8, wherein the metadata correction unit corrects the metadata on the basis of the trace path of the dependency analysis tree and each node on the trace path.

10. The data creation apparatus according to claim 1, wherein the metadata includes a combination of a value of an attribute and a key representing an attribute of each field.

11. The data creation apparatus according to claim 1, wherein the node extraction unit extracts a node on the trace path of the dependency analysis tree on the basis of matching results of parts of speech of the metadata.

12. The data creation apparatus according to claim 11, wherein the node extraction unit specifies relevant nodes as significant points or elements in a structured path determined in accordance with the matching result of the parts of speech of the metadata to maintain grammatical and semantic structure of the metadata.

13. The data creation apparatus according to claim 11, wherein the node extraction unit analyzes grammatical structure of the metadata to ensure consistency between different word fragments on the basis of the matching result of the parts of speech of the metadata.

14. The data creation apparatus according to claim 1, wherein the rank calculation unit ranks the metadata on the basis of the user's interest terms data and the confidence score.

15. The data creation apparatus according to claim 1, wherein the confidence score calculation unit calculates the confidence score by calculating probabilities of tokens of the metadata, calculating entropy of each token of the metadata, calculating a total entropy of the metadata, and performing logarithmic transformation on the total entropy.

16. The data creation apparatus according to claim 1, wherein the processor further executes a metadata correction unit which corrects the metadata by searching for a previous token of the metadata and checking consistency between the previous token and a node on the trace path of the dependency analysis tree.

17. The data creation apparatus according to claim 1, wherein the reviewing unit determines whether the metadata is appropriate or not and reflects the metadata in a data catalog if the metadata is determined to be appropriate.

18. The data creation apparatus according to claim 1, wherein the token verification unit searches for a leaf node which starts with a token on the trace path of the dependency analysis tree and traces the dependency analysis tree to confirm the trace path from the token to a parent node of an uppermost part of the dependency analysis tree.

19. The data creation apparatus according to claim 1, wherein the grouping unit classifies each piece of metadata by grouping in accordance with the user's interest terms data reflecting a user's intention.

20. A data creation method executed by a processor and comprising:

a node extraction step in which a node extraction unit extracts a node on a trace path of a dependency analysis tree based on an input document;

a token verification step in which a token verification unit performs token verification to verify whether metadata generated by inputting the document into a large language model is appropriate or not by comparing the token obtained from the nodes on the trace path of the dependency analysis tree with the metadata generated by the large language model to confirm correct usage and terminology in a context of the document;

a token match score calculation step in which a token match score calculation unit obtains a token match score on a basis of a result of the token verification;

a grouping step in which a grouping unit groups the metadata in accordance with user's interest terms data which reflects a user's interests using the metadata as it is if the token match score satisfies a predetermined condition;

a confidence score calculation step in which a confidence score calculation unit calculates a confidence score for the grouped metadata;

a rank calculation step in which a rank calculation unit ranks the metadata in accordance with the confidence score; and a display step in which a reviewing unit displays the ranked metadata on a rank display screen together with the rank.

* * * * *